(12) United States Patent
Flynn

(10) Patent No.: US 6,415,365 B1
(45) Date of Patent: Jul. 2, 2002

(54) WRITE BUFFER FOR USE IN A DATA PROCESSING APPARATUS

(75) Inventor: David Walter Flynn, Cambridge (GB)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 09/995,676

(22) Filed: Nov. 29, 2001

Related U.S. Application Data

(63) Continuation of application No. 09/246,735, filed on Feb. 9, 1999.

(30) Foreign Application Priority Data

Mar. 25, 1998 (GB) .............................................. 9806394

(51) Int. Cl.⁷ .............................................. G06F 12/00
(52) U.S. Cl. ...................................................... 711/156
(58) Field of Search .............................. 714/156; 710/52

(56) References Cited

U.S. PATENT DOCUMENTS 5,363,486 A   11/1994   Olson et al.
5,613,136 A    3/1997   Casavant et al.

FOREIGN PATENT DOCUMENTS

WO      WO 94/11828       5/1994

OTHER PUBLICATIONS

David Patterson et al, "Computer Architecture A Quantitative Approach" 1990, pp. 380–383.

*Primary Examiner*—Kevin Verbrugge
(74) *Attorney, Agent, or Firm*—Nixon & Vanderhye P.C.

(57) ABSTRACT

The present invention provides a data processing apparatus comprising a processor core for generating addresses identifying locations in a memory and data values for storing in the memory, and a write buffer for storing the addresses and data values output by the processor core, and for subsequently outputting said addresses and data values to cause the data values to be stored in said memory. The write buffer comprises a plurality of rows, each row being arranged to store an address or data value, and each row having associated therewith a flag field settable to indicate whether that row contains an address or a data value.

In accordance with the present invention, the write buffer provided by the data processing apparatus adaptively adjusts the number of rows it requires for addresses, and hence can be arranged to occupy a relatively small area, whilst still efficiently supporting both burst mode and non-burst mode write traffic.

18 Claims, 3 Drawing Sheets

WRITE BUFFER FOR USE IN A DATA PROCESSING APPARATUS

This application is a continuation of application Ser. No. 09/246,735, filed Feb. 9, 1999.

BACKGROUND OF THE INVENTION

1. Field of the Invention

The present invention relates to a data processing apparatus for buffering addresses identifying locations in a memory, and data values to be written to those memory locations. The term 'data value' is used herein to refer to both instructions and to items or blocks of data, such as data words.

2. Description of the Prior Art

A typical data processing apparatus includes a processor core (or CPU) arranged to execute a sequence of instructions that are applied to data supplied to the processor core. Generally, a memory may be provided for storing the instructions and data (collectively referred to herein as "data values") required by the processor core. Further, it is often the case that one or more caches are provided for storing data values required by the processor core, so as to reduce the number of accesses required to the memory.

Whilst the use of a cache improves the processing speed of the processor core, there is still the requirement for the processor core to read data values from, and write data values to, the memory, and these processes are relatively slow, thereby adversely affecting the processing speed of the processor core.

To alleviate the impact on processing speed resulting from writing data values to a memory, it is known to provide a write buffer that is typically arranged to decouple a cached CPU from the memory, so as to allow the processor bus to complete a write operation to the intermediate write buffer, and for that write buffer to then autonomously perform the write to the memory bus. By this approach, the CPU does not need to wait for the write process to complete before proceeding to execute the next instruction. Further, the write buffer depth can be increased beyond a single register to enable a plurality of CPU data writes to be buffered, for example by using a First-In-First-Out (FIFO) buffer to maintain write transaction ordering.

In general terms, a write buffer presents a "slave" interface to a "master" at its input side, and presents an "initiator bus" interface to the memory bus on its output side. The slave interface generally requires address (a), control (c) and write data (d) signals. The control signal will typically include control information such as operand size, protection and access flags. The master interface, for example the interface between the CPU and the processor bus, similarly must source the same address, control and write data information, and may additionally perform funnelling to narrower or wider data bus width.

In a simple prior art write buffer, the slave interface of the write buffer will have a width of "a+c+d" bits (for address, control and data bus widths). In such an arrangement, the write buffer storage requirements are:

a+c+d bits wide x number of write buffer slots.

Generally, when developing data processing apparatus, such as integrated circuits, there is a desire to keep the circuit as small as possible. The space that an integrated circuit occupies is at a premium. The smaller an integrated circuit is, the less expensive it will be to manufacture and the higher the manufacturing yield. For this reason, it is clear that the number of write buffer slots provided within the write buffer cannot be increased at will, as the overall size of the integrated circuit must be kept as small as possible.

Whenever the write buffer fills to capacity, the processor stalls on a subsequent write operation until a free slot in the write buffer becomes available. The maximum write buffer depth is application dependent, and is a trade off between chip area, sustainable burst write bandwidth, and the "latency" of the memory, or secondary, bus where a read transaction is blocked until the write buffer has been emptied.

For cached processors and higher bandwidth systems, much of the write traffic is in the form of "bursts" (i.e. cache line replacements or stack context saves), where a base address and a fixed or variable number of data words are transferred. However, there will still typically be some non-burst (eg. 8-bit and 16-bit) accesses (eg. character or "short" data).

In such arrangements, the area required by the write buffer may be reduced by separating the address/control paths from the data path so as to provide two logically separate write buffers, one for the address and control signals, and one for the data signals. Since there will generally be less addresses than data values in burst mode operation, then the number of address slots provided in the write buffer can be significantly less than the data slots provided in the write buffer. However, this saving in area to provide fewer address slots is typically traded for more data slots, such that the overall area of the write buffer is optimized for typical usage.

Hence, for such burst mode write buffers, the write buffer storage is:

a+c bits wide x number of address slots d bits wide x number of data slots

In such an arrangement, an address incrementer is typically required to re-synthesize the burst addresses as the contents of the write buffer are output to memory, and more complex control logic is required to interlock the address and data write buffer reconstruction.

Whilst such an arrangement is clearly advantageous for burst mode write traffic, if there are any non-burst stores (i.e. byte structure access), then the number of address slots becomes a limiting factor, since in this non-burst mode, there will be one address for each data word.

Given that many data processing apparatus typically employ both burst mode and non-burst mode stores to memory, it would be desirable to provide the data processing apparatus with a write buffer that operates efficiently for both burst mode write traffic and non-burst mode write traffic, without having to increase the size of the write buffer with respect to the size of known prior art write buffers.

SUMMARY OF THE INVENTION

Viewed from a first aspect, the present invention provides a data processing apparatus comprising: a processor core for generating addresses identifying locations in a memory and data values for storing in the memory; a write buffer for storing the addresses and data values output by the processor core, and for subsequently outputting said addresses and data values to cause the data values to be stored in said memory; the write buffer comprising a plurality of rows, each row being arranged to store an address or data value, and each row having associated therewith a flag field settable to indicate whether that row contains an address or a data value.

In accordance with the present invention, each row of the write buffer is able to store either an address or a data value, an additional flag field is associated with each row, and the flag field is settable to indicate whether that row contains an address or a data value. Hence, in burst-mode, a particular row will be used to store the base address, with the flag field for that row being set accordingly to indicate that an address is contained within that row, and then subsequently the data values forming the burst traffic will be stored in other rows of the write buffer, with the flag fields of those rows being set to indicate that data values are contained within those rows. This approach makes very efficient use of the available write buffer area when buffering burst mode write traffic.

However, it is clear that the arrangement of the present invention also supports non-burst write traffic, where the rows of the write buffer will alternately store addresses and data values, with the flag fields for each row being set accordingly.

It has been found that a write buffer in accordance with the present invention can be arranged to occupy a relatively small area, whilst providing a good compromise between a write buffer optimized for non-burst mode traffic, and a write buffer optimized for burst mode traffic.

In preferred embodiments, each row comprises 'n' bits and the flag field comprises one or more of said 'n' bits. Preferably, said flag field comprises a single bit, since this keeps the space required for the flag field to a minimum whilst ensuring that sufficient information is still provided to determine whether any particular row contains an address or a data value.

In preferred embodiments, the data processing apparatus further comprises a multiplexer for receiving said addresses and data values from the processor core; and input control logic for controlling the multiplexer to output either a data value or an address to the write buffer for storage in a particular row; the input control logic further controlling the write buffer to set the flag field for that particular row to indicate whether that row has an address or a data value stored therein.

Further, in preferred embodiments, each row further comprises a control field, wherein if an address is stored in a particular row, then the control field of that row is used to store control data associated with the address. Hence, in this arrangement, the input control logic will cause the multiplexer to output the address for storing within the particular row, and also the control data for storing within the control field of that row, with the flag field being set to indicate that that particular row contains an address.

Preferably, if a data value is stored in a particular row, then the control field is used to store mask data identifying the region or regions of that row containing data. Hence, the control field is still used, even if the row is being used to store a data value rather than an address. In preferred embodiments, a plurality of bytes in the row are reserved for storing the data value, and the mask data indicates which of said plurality of bytes contain the data value. Hence, if the write buffer is connected to a 32-bit data bus, such that a data word can be up to four bytes long, then four bytes will be reserved for storing the data value in each row. However, if the data value to be stored in a particular row is less than four bytes in length, then not all of the four bytes in the row will be used to store the data value. In this instance, the mask data is used to indicate which of the plurality of bytes in the row do contain the data value. In preferred embodiments, the input control logic is arranged to control the write buffer to generate the mask data.

Further, in preferred embodiments, the data processing apparatus comprises output control logic for controlling the output to the memory of the addresses and data values stored in the write buffer. Preferably, the data processing apparatus comprises a demultiplexer for receiving the contents of a row of the write buffer, the output control logic being arranged to determine from the flag field whether an address or a data value is included in the row, and to instruct the demultiplexer to output a data value onto a data line or an address onto an address line. The input and output control logic may be provided by separate logic components, but in preferred embodiments are provided by the same logic component.

In preferred embodiments, any burst mode stores in the write buffer are resynthesized before passing on to the memory bus. Hence, in preferred embodiments, the data processing apparatus further comprises an incrementer for receiving addresses output on the address line. Thus, if after receiving the address at the incrementer, a plurality of rows of data values are read out from the write buffer, then each time a data value is placed on the memory bus, the address can be incremented by the incrementer, and the corresponding incremented address output on to the address bus of the memory bus. In this way, the memory will receive the necessary address information to enable it to store each data value received.

In preferred embodiments, the demultiplexer is arranged to output onto a control line control data within the row received from the write buffer, and the data processing apparatus further comprises a register for storing the control data. In preferred embodiments, the control data will be output each time a row of the write buffer containing a data value is output on to the memory bus. By storing the control data in a register, this information can be output on to the control bus of the memory bus as required.

In preferred embodiments, the write buffer is a First-In-First-Out (FIFO) buffer, since this ensures that write transaction ordering is maintained.

Viewed from a second aspect, the present invention provides a write buffer for storing addresses identifying locations in a memory and data values for storing in the memory, and for subsequently outputting said addresses and data values to cause the data values to be stored in said memory, the write buffer comprising: a plurality of rows., each row being arranged to store an address or data value, and each row having associated therewith a flag field settable to indicate whether that row contains an address or a data value.

BRIEF DESCRIPTION OF THE DRAWINGS

An embodiment of the invention will be described hereinafter, by way of example only, with reference to the accompanying drawings in which like reference signs are used for like features, and in which.

DESCRIPTION OF A PREFERRED EMBODIMENT

Figure 1:
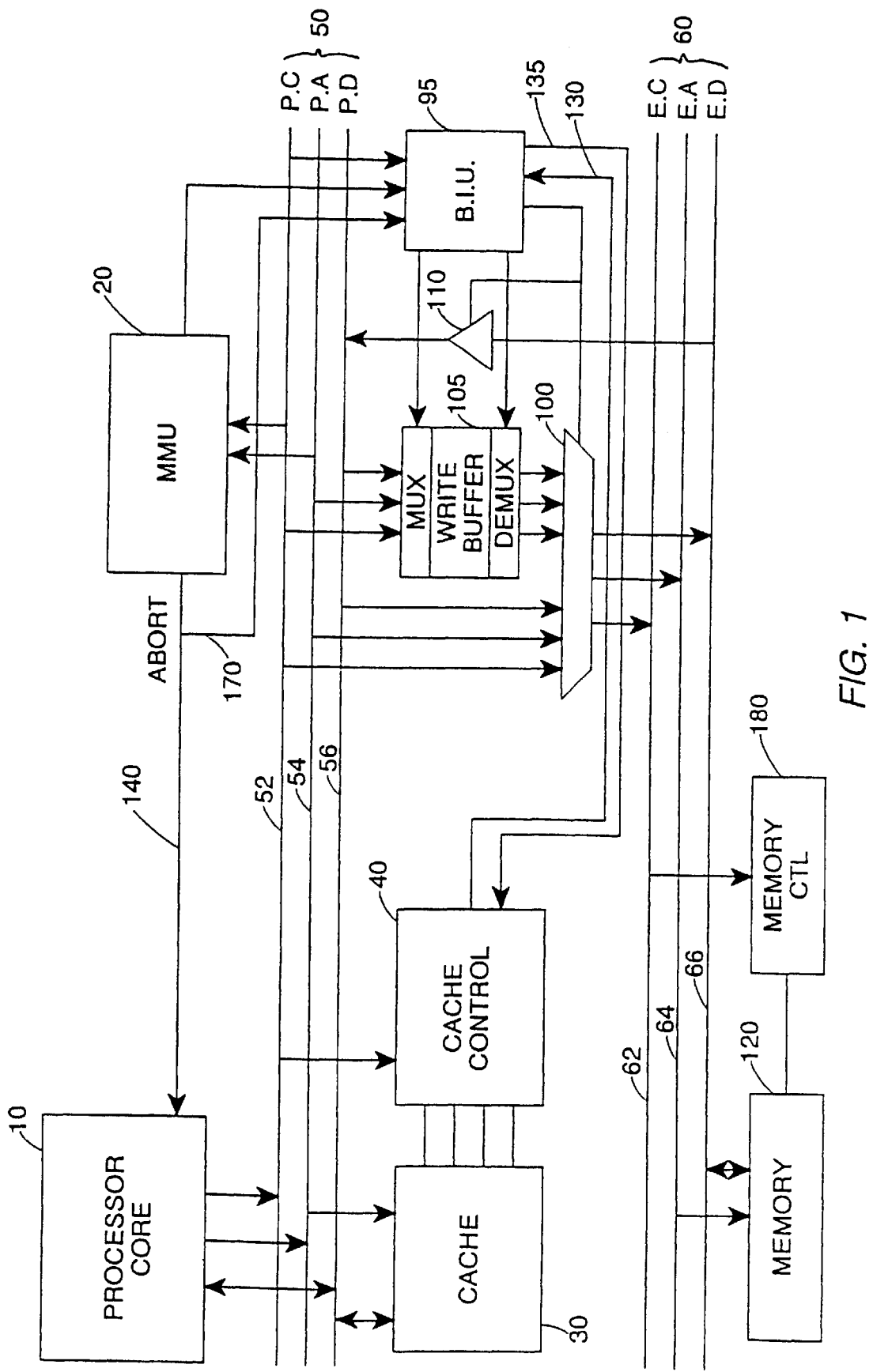
FIG. 1 is a block diagram illustrating a data processing apparatus in accordance with the preferred embodiment of the present invention.

A data processing circuit in accordance with the preferred embodiment of the present invention will be described with reference to the block diagram of FIG. 1. As shown in FIG. 1, the data processing circuit has a processor core 10 arranged to process instructions received from memory 120. Data required by the processor core 10 for performing those instructions may also be retrieved from memory 120. A cache 30 is provided for storing data and instructions retrieved from the memory 120 so that it is subsequently readily accessible by the processor core 10. The cache control unit 40 is also provided to control the storage of instructions and data in the cache 30, and to control the retrieval of the data and instructions from the cache.

When the processor core 10 requires an instruction or an item of data (hereafter instructions or data will both be referred to as data values), it places the memory address of that data value on bus line 54 of processor bus 50. Further, the processor core 10 issues a processor control signal on bus line 52. The processor control signal includes information such as whether the address corresponds to a read or a write request, the type of access (eg. sequential), the size of the access (eg. word, byte), the operating mode of the processor (eg. supervisor or user), etc. This processor control signal is received by the cache control unit 40 and prompts the cache control unit to determine whether the required data value is stored within the cache 30. The cache control unit 40 instructs the cache 30 to compare the address on bus line 54 with the addresses in the cache to determine whether the data value corresponding to that address is stored within the cache. If so, the data value is output from the cache 30 onto the data bus line 56 where it is then read by the processor core 10. If the data value corresponding to the address is not within the cache 30, then the cache control unit 40 passes a signal over line 130 to the bus interface unit (BIU) 95 to indicate that the data value needs to be retrieved from memory 120.

Whilst this cache look up process is taking place, the memory management unit (MMU) 20 also receives the processor control signal on bus line 52, and upon determining that the processor control signal relates to a potential read or write access to memory 120 or cache 30, is arranged to examine the address placed by the processor core 10 on bus line 54.

Different areas of the memory 120 may be used to store data values having different attributes, such as protection, cacheable and bufferable attributes. Hence, the MMU 20 is arranged to determine from the address the attributes used to control access to the memory 120 or use of the data values retrieved from the cache 30. These attributes are then passed to the BIU 95.

As mentioned earlier, the MMU 20 receives the processor control signal from bus line 52, this processor control signal defining, amongst other things, the mode of operation of the processor core 10. Hence this information can be used by the MMU 20 to determine whether the attributes determined from the address allow the processor core 10 in its current mode of operation to have access to the memory address requested. For example, if the processor control signal indicates that the processor core 10 is in a user mode, and the attributes determined from the address indicate that the memory address can only be accessed in supervisor mode, then the MMU 20 can be arranged to produce an abort signal on path 140 to the processor core 10 and on path 170 to the Bus Interface Unit 95.

The processing performed by the MMU 20 preferably happens at the same time as the cache look up process so as to maintain sufficient processing speed. If the data value requested is available in the cache 30, and the MMU 20 does not produce an abort signal on lines 140, 170 then the processor core 10 will use the data retrieved from cache 30. However, if the data value requested is not available in cache, then, as discussed earlier, a signal will be sent over path 130 instructing the Bus Interface Unit (BIU) 95 to access the memory 120 for the data value.

The BIU 95 will examine the processor control signal on bus line 52 to determine whether the instruction issued by the processor core 10 is a read or a write instruction. Assuming it is a read instruction, and that no abort signal is received over path 170 from the logic 90, then the BIU 95 will instruct the multiplexer 100 to pass the address from bus line 54 on to the external address bus line 64 of bus 60 (this is assuming that no pending write instructions to memory 120 are pending in the write buffer 105—if there are any such pending write instructions, these will be completed prior to the read instruction. The action of the write buffer is discussed in more detail later). A control signal will also be placed on bus line 62 which is used by memory controller 180 to control access to the memory 120. The memory controller 180 will determine from the control signal on bus line 62 that a memory read is required, and will instruct the memory to output on the data bus line 66 the data at the address indicated on address bus line 64.

The BIU 95 will send a signal to buffer 110 to cause the buffer 110 to pass the data placed by the memory 120 on external bus line 66 to the processor bus line 56. Additionally, if the attributes received by the BIU 95 from the MMU 20 indicate that the address contains a cacheable data value, then the BIU 95 will send a signal over path 135 to the cache control 40 to instruct the cache control to store the retrieved data value in cache 30. The data value retrieved from the memory 120 and placed on bus line 56 will then be stored in the cache 30 and also passed to the processor core 10. Subsequently, that data value can readily be accessed by the processor core 10 directly from the cache. If the attributes received by the BIU 95 indicate that the data value is not cacheable, then the data will not be stored in cache, and the processor core 10 will read the data value from bus line 56.

The above description has illustrated how the MMU 20 is used to control access to the memory 120 for the purposes of reading data values from the memory 120. In the event that the address issued by the processor core 10 is an address to which the processor wishes to write a data value, then the following procedure takes place.

The processor core will place a processor control signal on bus line 52, an address on bus line 54, and the data value to be stored on bus line 56. The MMU 20 will examine the processor control signal on bus line 52, and upon determining that the processor control signal relates to a write access to memory 120, will examine the address placed by the processor core 10 on bus line 54. The attributes associated with that address will then be output to the BIU 95.

The BIU 95 will examine the processor control signal on bus line 52 to determine whether the instruction issued by the processor core 10 is a read or a write instruction. Assuming it is a write instruction, the BIU will determine that a write procedure needs to be employed, and will use the attribute information received from the MMU 20 to control that write procedure.

The MMU 20 will also have determined from the attributes and from the processor control signal whether the processor core is able to write to the particular address in its current mode of operation, and if not, will have issued an abort signal. Any abort signal will be sent to the BIU 95 over path 170 to instruct it to disregard the write instruction, and will also be sent to the processor core 10 over path 140 to cause the data, address and control information to be removed from bus lines 56, 54 and 52, respectively, and to enable the processor core 10 to execute any exception procedure required in the event of such an abort.

However, assuming the processor core is entitled to write to the address placed on bus line 54, and hence no abort signal is received by the BIU 95, then the BIU 95 will use the attribute information from the MMU 20 to determine whether the data to be written is bufferable or not. If the data is bufferable, then the BIU 95 will instruct the write buffer 105 to retrieve the data, address and control signals from bus 50. Once this has been done, the next instruction can be processed by the processor core 10 without waiting for the write instruction to have been completed.

The write buffer is preferably a FIFO buffer. When the external bus 60 is free, the BIU 95 instructs the multiplexer 100 to output the next item from the write buffer onto the external bus 60. The multiplexer 100 will then output the necessary control, address and data signals on bus lines 62, 64 and 66 respectively, the memory controller 180 using the control signal to control the write access to memory 120. At this point, the data will be stored in the memory 120. As the data to be stored is sequentially processed from the write buffer 105, then at some point the data corresponding to the address issued by the processor on bus line 54 will be stored in the memory 120.

If, however, the Bus Interface Unit 95 determines that the address to which the data is to be stored is not bufferable, then the Bus Interface Unit 95 will instruct the multiplexer 100 to select the processor control, address and data information from bus lines 52, 54 and 56 directly. The multiplexer 100 will then output this information onto the external bus 60 so as to cause the data to be stored at the corresponding address in memory 120. However, prior to doing this, the write buffer 105 would typically be drained of any entries within it, so as to ensure that the write instructions are processed in the correct order. Once the non bufferable data corresponding to the current write instruction has been stored, the next instruction can then be processed.

The above description of FIG. 1 has provided a general overview of the operation of a typical data processing apparatus. A more detailed description of the operation of the write buffer 105 of preferred embodiments of the present invention will now be described in more detail with reference to FIGS. 2 and 3.

Figure 3:
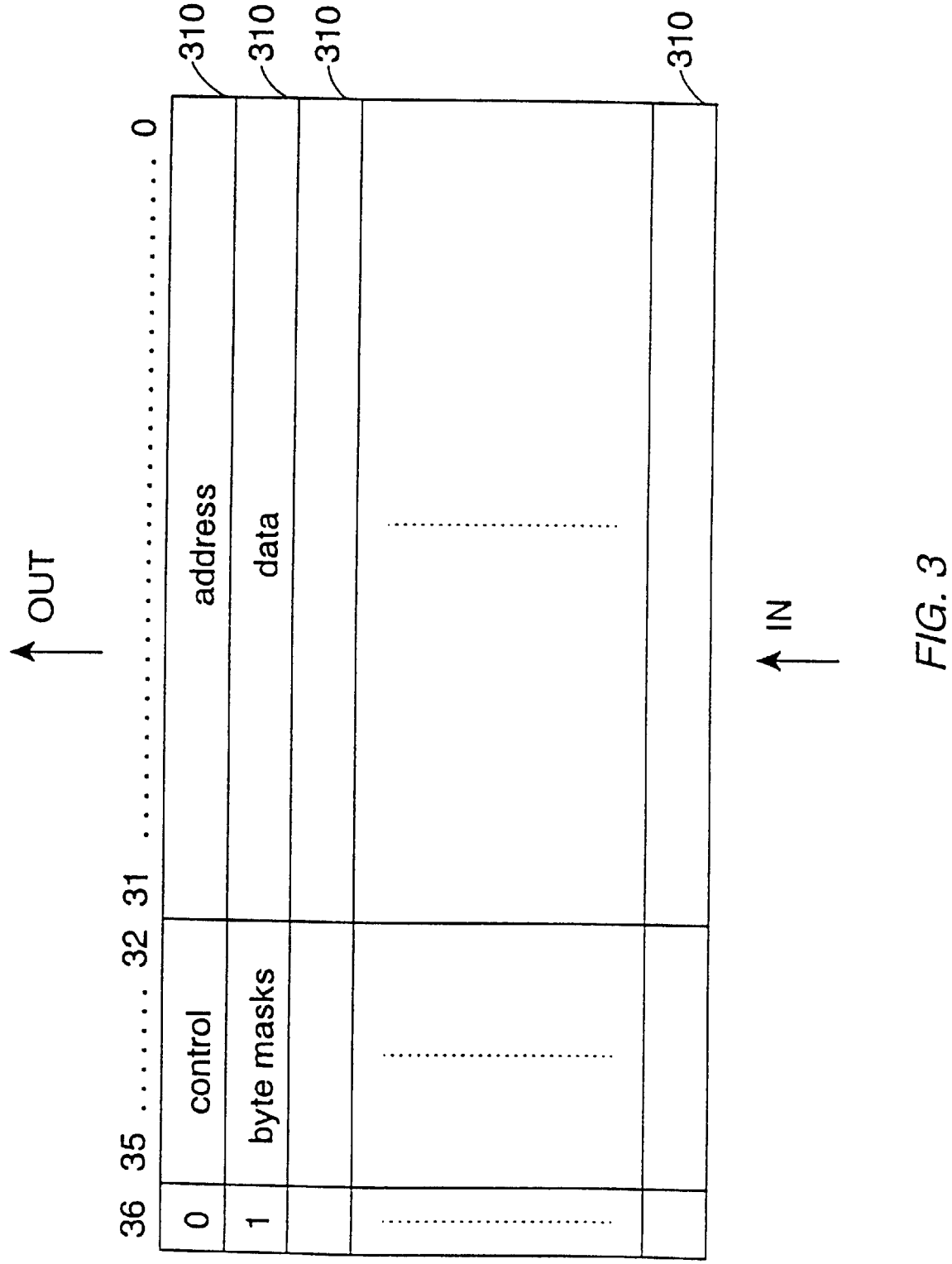
FIG. 3 illustrates the structure of the adaptive write buffer of preferred embodiments of the present invention.

FIG. 3 illustrates the structure of the write buffer in preferred embodiments of the present invention. The structure illustrated in FIG. 3 is suitable for use with a 32-bit RISC processor connected to a processor bus consisting of a 32-bit data bus, a 32-bit address bus, and a 4-bit control bus. Hence, bits 0–31 of each row 310 of the write buffer are reserved for storing either an address or a data value. Further, bits 32–35 are reserved for storing either a 4-bit control data associated with an address stored in that row, or to store a 4-bit data mask associated with a data value stored in that row.

In preferred embodiments the four bits of control data stored in those rows containing an address include a 2-bit size field (8, 16, 32, 64 bit data transfer width), plus any additional control flags required, such as a privilege ("supervisor") access indicator.

In addition to the above mentioned 36 bits, in accordance with preferred embodiments of the present invention, a single 37th bit is added to each row to provide a flag field to indicate whether that row contains an address, or a data value. In preferred embodiments, a logic "0" value indicates that the row contains an address, whereas a logic "1" value indicates that the row contains a data value. Clearly, the meaning of these logical values could be reversed without departing from the present invention, such that a logic 1 value would indicate an address and a logic 0 value would indicate a data value.

In preferred embodiments, as illustrated in FIG. 3, data output by the processor core is input to the bottom of the write buffer, and the write buffer is a FIFO buffer, such that the item that has been stored in the buffer the longest is output first, each row being read out from the top of the buffer as illustrated in FIG. 3.

In burst mode, a base address, and the corresponding control data will be stored in a first row of the write buffer, and a logic 0 value will be added to the 37th bit to indicate that that row stores an address. Then, each data value following the base address is stored in a separate row of the write buffer, with the 37th bit being set to a logic 1 value to indicate that data is contained in that row. Hence, for a write buffer that is sixteen rows deep, bursts of up to fifteen data word writes can be stored within the write buffer before the write buffer becomes full.

In a non-burst mode, then addresses and data values will be stored alternately in the write buffer, such that a row containing an address is followed by a row containing the data value to be stored at that address. As is clear from FIG. 3. the data value stored in a particular row can be a data word, in this example the data word being 32-bits, or 4 bytes, long. However, alternatively, the data value can be 1 byte, 2 bytes or 3 bytes long, often referred to as sub-word-length data values. In such situations, the 4-bit data mask placed in bits 32–35 of each row containing a data value is used to identify which of the 4 bytes allocated for the data value actually store the data value. Hence, in preferred embodiments, if the data value is a data word, then all 4-bits of the data mask will be set to a logic "1" value, whereas if any of the bytes do not contain the data value, then the corresponding bit in the data mask will be set to a logic "0" value.

From the above description, it will be appreciated that the write buffer is very flexible, and adapts automatically to store either burst mode write traffic or non-burst mode write traffic. Hence, taking the sixteen row deep FIFO example discussed earlier, burst writes of up to fifteen data words through to non-burst writes of up to eight 1 byte wide stores can be fitted within the FIFO write buffer structure of preferred embodiments, which adaptively adjust the number of slots it requires for addresses.

It has been found that this adaptive adjustment is very suitable for the write bandwidth of basic Load and Store RISC processors, which can produce burst-mode sustained writes with few addresses for context and register bank save processes, but also generate fewer byte and half-word non-burst store operations with more address information.

Having reviewed the structure of the write buffer of preferred embodiments with reference to FIG. 3, the operation of the write buffer will now be discussed in more detail with reference to FIG. 2.

Figure 2:
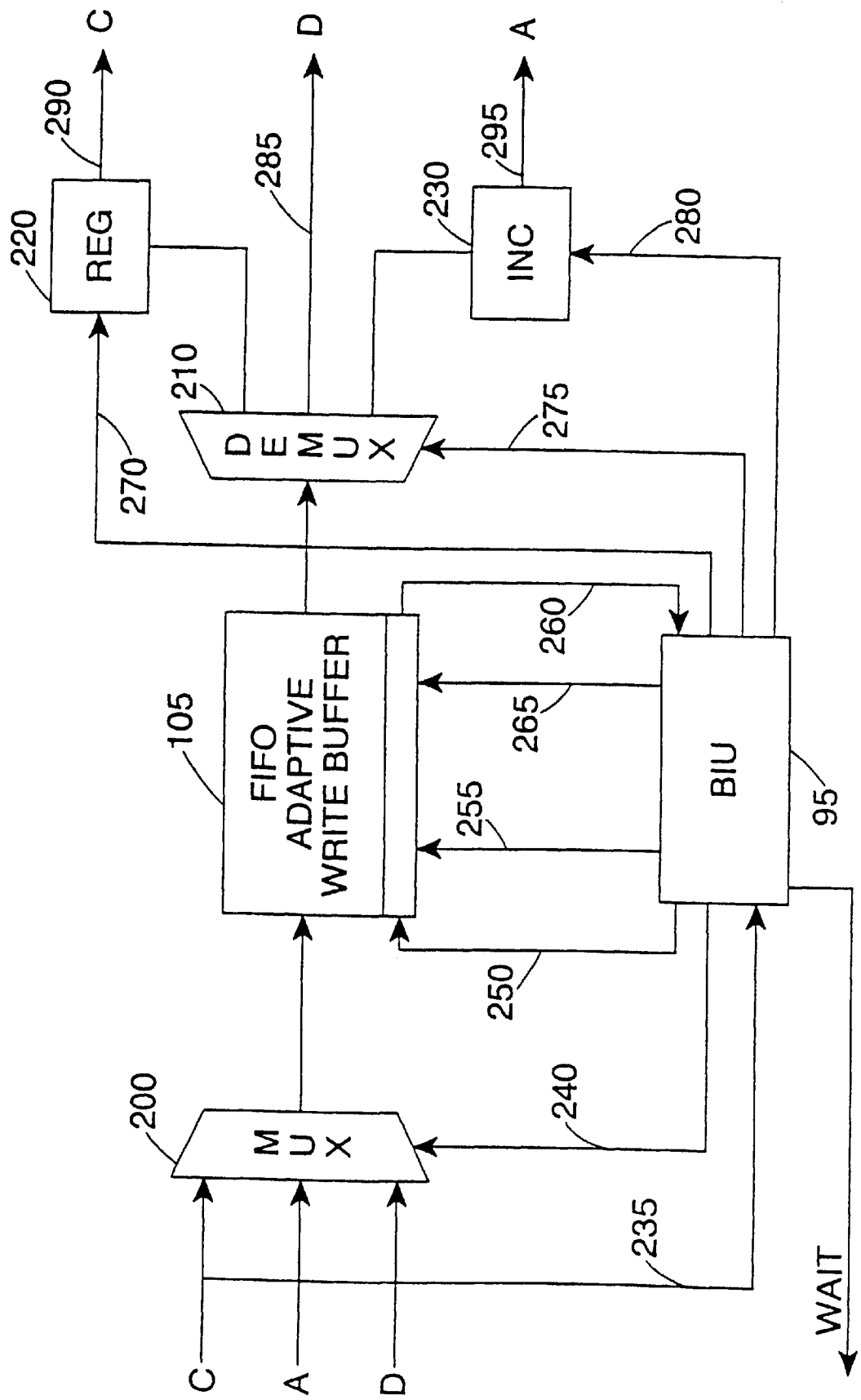
FIG. 2 is a block diagram illustrating the logic provided to store address, data and control signals in the write buffer of preferred embodiments of the present invention, and subsequently to read and resynchronise the address, data and control signals for outputting to a memory.

As is apparent from FIG. 2, the write buffer 105 is separated from the processor bus 50 by a multiplexer 200. As discussed earlier with reference to FIG. 1, the BIU 95 has access to, amongst other things, the control signal on bus line 52, this being indicated by the path 235 in FIG. 2. Upon determining that the data to be written is bufferable, the BIU 95 will send a signal over path 240 to the multiplexer 200 instructing it to output the control and address data on bus lines 52 and 54 to the write buffer 105. The BIU 95 will also instruct the write buffer 105 over path 255 to store the control and address data provided by the multiplexer 200. In addition, the BIU 95 will send a signal over path 250 to set the flag field, in preferred embodiments the 37th bit of the relevant row, to a logic "0" value to indicate that the row contains an address.

The process will then be repeated for the data on the data bus 56, with the BIU 95 instructing the multiplexer 200 to output the data to the write buffer 105, and the BIU 95 setting the flag field of the relevant row to a logic "1" value. Further, the BIU 95 will cause the write buffer 105 to generate the mask data to be placed in bits 32–35 of the row to indicate which of the four bytes in the row allocated for the data value actually contain the data value.

If the write operation is a non-burst write, then all the necessary control, address and data information for that write operation will now be stored in the write buffer, and the BIU 95 will be arranged to repeat the above process for each subsequent non-burst write operation, assuming that the write operation is bufferable. If, however, the write is a burst mode write, then the BIU 95 will continue to instruct the multiplexer 200 to output the data on the data bus 56 to the write buffer 105 for each data word in the burst mode write operation. Additionally, the BIU 95 will send a signal over path 250 for each data word stored in the write buffer in order to set the flag field of the corresponding rows to a logic "1" value to indicate that those rows contain data, and will cause the write buffer to generate the necessary mask data.

When data is to be read out of the write buffer 105 for storing in the memory 120, then the BIU 95 will firstly determine the value of the flag field for the row of data to be read from the write buffer 105, this value being passed over the path 260 to the BIU 95. Since, in preferred embodiments, the write buffer 105 is a FIFO write buffer, then the data that has been stored in the write buffer the longest will be read out first.

Once the value of the flag field has been determined by the BIU 95, the BIU 95 will send signals over paths 265, 270, 275 and 280 to the write buffer 105, the demultiplexer 210, the register 220 and the incrementer 230 to control the output of the data onto the control 62, address 64 and data 66 buses of the external bus 60. In particular, if the flag field indicates that the row to be read out from the write buffer contains an address, then the BIU 95 will instruct the write buffer 105 to output the row, and will instruct the demultiplexer 210 to pass bits 0–31 to the incrementer 230, and bits 32–35 to the register 220. Hence, by this approach, the address will be passed to the incrementer 230 and the control data will be passed to the register 220. Both the register 220 and the incrementer 230 will have been instructed to store these values via the signals from the BIU 95 passed over the paths 270 and 280. respectively.

The BIU 95 will then determine the value of the flag field for the next row, this being a logic "1" value to indicate that the row contains a data value. It will then instruct the write buffer 105 to output the row to the demultiplexer 210, and will instruct the demultiplexer 210 over the path 275 to output on the data path 285 the data value stored in those of bits 0–31 identified by the mask data. At this time, the register 220 and the incrementer 230 will also output the control and address data on the control path 290 and the address path 295, respectively. This data will then be passed to the multiplexer 100 (shown in FIG. 1) for outputting onto the external bus 60.

If the BIU 95 then determines that the next row to be read out from the write buffer contains an address, then the above process will be repeated so that the control and address information are passed to the register 220 and incrementer 230. respectively, and then the data is output on path 285 whilst the control and address information are output over the paths 290 and 295. However, if the BIU 95 determines that the next row also includes data, then it will instruct the write buffer 105 to output the data to the demultiplexer 210, will instruct the demultiplexer to output the data in bits 0–31 (as identified by the mask data) on the data path 285, will instruct the register 220 to output the control data already stored in the register 220 out on the path 290, and will instruct the incrementer 230 to increment the address and then output the incremented address on the address path 295. By this approach, the control, data and address information is re-synthesised prior to being passed out onto the external bus 60.

If at any stage, the BIU 95 determines that the write buffer 105 is full, and the BIU 95 determines that a further bufferable write operation is to be added to the write buffer, then the BIU 95 will issue a wait signal to the processor bus 50 to advise that the write buffer 105 is full. How this information is used will be dependent on which logical unit is initiating the bufferable write operation. As an example, as discussed earlier, if the processor core 10 is issuing a bufferable write operation, and the write buffer 105 is full, then the processor core will stall until a free slot in the write buffer becomes available.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

I claim:

1. A data processing apparatus for performing both burst mode and non-burst mode writing of data to a memory, said apparatus comprising:

a processor core for generating an address identifying a location in a memory and an associated plural number of data values for storage in the memory at locations derivable from said address;

a write buffer for storing the address and said associated variable number of data values output by the processor core, and for subsequently outputting said address and said associated variable number of data values to cause the data values to be stored in said memory at said locations derivable from said address;

the write buffer comprising a plurality of rows, each row being arranged to store an address or data value, and each row having associated therewith a flag field settable to indicate whether that row contains an address or a data value.

2. A data processing apparatus as claimed in claim 1, wherein each row comprises 'n' bits and the flag field comprises one or more of said 'n' bits.

3. A data processing apparatus as claimed in claim 1, wherein said flag field comprises a single bit.

4. A data processing apparatus as claimed in claim 1, further comprising:

a multiplexer for receiving said addresses and data values from the processor core; and input control logic for controlling the multiplexer to output either a data value or an address to the write buffer for storage in a particular row;

the input control logic further controlling the write buffer to set the flag field for that particular row to indicate whether that row has an address or a data value stored therein.

5. A data processing apparatus as claimed in claim 1, wherein each row further comprises a control field, wherein if an address is stored in a particular row, then the control field of that row is used to store control data associated with the address.

6. A data processing apparatus as claimed in claim 5, wherein if a data value is stored in a particular row, then the control field is used to store mask data identifying the region or regions of that row containing data.

7. A data processing apparatus as claimed in claim 6, wherein a plurality of bytes in the row are reserved for storing the data value, and the mask data indicates which of said plurality of bytes contain the data value.

8. A data processing apparatus as claimed in claim 6, further comprising:
 a multiplexer for receiving said addresses and data values from the processor core; and
 input control logic for controlling the multiplexer to output either a data value or an address to the write buffer for storage in a particular row;
  the input control logic further controlling the write buffer to set the flag field for that particular row to indicate whether that row has an address or a data value stored therein;
   wherein the input control logic is arranged to control the write buffer to generate the mask data.

9. A data processing apparatus as claimed in claim 1, further comprising output control logic for controlling the output to the memory of the addresses and data values stored in the write buffer.

10. A data processing apparatus as claimed in claim 9, further comprising a demultiplexer for receiving the contents of a row of the write buffer, the output control logic being arranged to determine from the flag field whether an address or a data value is included in the row, and to instruct the demultiplexer to output a data value onto a data line or an address onto an address line.

11. A data processing apparatus as claimed in claim 10, further comprising an incrementer for receiving addresses output on the address line.

12. A data processing apparatus as claimed in claim 10, wherein each row further comprises a control field, wherein if an address is stored in a particular row, then the control field of that row is used to store control data associated with the address, and wherein the demultiplexer is arranged to output onto a control line control data within the row received from the write buffer, and the data processing apparatus further comprises a register for storing the control data.

13. A data processing apparatus as claimed in claim 1, wherein the write buffer is a First-In-First-Out (FIFO) buffer.

14. A write buffer for storing both burst mode and non-burst mode writing of data to a memory, said write buffer storing an address identifying locations in a memory and an associated plural number of data values for storage in the memory at locations derivable from said address, and for subsequently outputting said address and said associated variable number of data values to cause the data values to be stored in said memory at said locations derivable from said address, the write buffer comprising:
 a plurality of rows, each row being arranged to store an address or data value, and each row having associated therewith a flag field settable to indicate whether that row contains an address or a data value.

15. A data processing apparatus for performing both burst mode and non-burst mode writing of data to a memory, said apparatus comprising:
 a processor core for generating an address identifying a location in a memory and an associated plural number of data values for storage in the memory at locations derivable from said address;
 a write buffer for storing the address and said associated variable number of data values output by the processor core, and for subsequently outputting said address and said associated variable number of data values to cause the data values to be stored in said memory at said locations derivable from said address;
 the write buffer comprising a plurality of rows, each row being arranged to store an address or data value, and each row having associated therewith a flag field settable to indicate whether that row contains an address or a data value, wherein each row further comprises a control field, wherein if an address is stored in a particular row, then the control field of that row is used to store control data associated with the address, wherein if a data value is stored in a particular row, then the control field is used to store mask data identifying the region or regions of that row containing data.

16. A data processing apparatus as claimed in claim 15, wherein a plurality of bytes in the row are reserved for storing the data value, and the mask data indicates which of said plurality of bytes contain the data value.

17. A data processing apparatus as claimed in claim 15, further comprising:
 a multiplexer for receiving said addresses and data values from the processor core; and
 input control logic for controlling the multiplexer to output either a data value or an address to the write buffer for storage in a particular row, the input control logic further controlling the write buffer to set the flag field for that particular row to indicate whether that row has an address or a data value stored therein;
  wherein the input control logic is arranged to control the write buffer to generate the mask data.

18. A write buffer for storing both burst mode and non-burst mode writing of data to a memory, said write buffer storing an address identifying a location in a memory and an associated plural number of data values for storage in the memory at locations derivable from said address, and for subsequently outputting said address and said associated variable number of data values to cause the data values to be stored in said memory at said locations derivable from said address, the write buffer comprising:
 a plurality of rows, each row being arranged to store an address or data value, and each row having associated therewith a flag field settable to indicate whether that row contains an address or a data value, wherein each row further comprises a control field,
  wherein if an address is stored in a particular row, then the control field of that row is used to store control data associated with the address, wherein if a data value is stored in a particular row, then the control field is used to store mask data identifying the region or regions of that row containing data.

* * * * *